(12) United States Patent
Lérant

(10) Patent No.: US 10,497,107 B1
(45) Date of Patent: Dec. 3, 2019

(54) METHOD, COMPUTER PROGRAM PRODUCT AND COMPUTER READABLE MEDIUM FOR GENERATING A MASK FOR A CAMERA STREAM

(71) Applicant: AImotive Kft., Budapest (HU)

(72) Inventor: Mátyás Lérant, Nagykanizsa (HU)

(73) Assignee: AImotive Kft., Budapest (HU)

( * ) Notice: Subject to any disclaimer, the term of this patent is extended or adjusted under 35 U.S.C. 154(b) by 0 days.

(21) Appl. No.: 16/513,802

(22) Filed: Jul. 17, 2019

(51) Int. Cl.
| G06T 5/50 | (2006.01) |
| G06T 7/13 | (2017.01) |
| G06T 5/20 | (2006.01) |
| G06T 5/00 | (2006.01) |
| G06T 5/40 | (2006.01) |

(52) U.S. Cl.
CPC ............... G06T 5/50 (2013.01); G06T 5/002 (2013.01); G06T 5/20 (2013.01); G06T 5/40 (2013.01); G06T 7/13 (2017.01)

(58) Field of Classification Search
CPC .. G06T 5/50; G06T 7/13; G06T 5/002; G06T 5/20; G06T 5/40
See application file for complete search history.

(56) References Cited

U.S. PATENT DOCUMENTS

| 6,061,476 A | 5/2000 | Nichani | |
| 7,545,984 B1* | 6/2009 | Kiel | G06K 9/46 345/619 |
| 8,514,413 B2* | 8/2013 | Fujiwara | G03G 15/237 358/1.12 |
| 2008/0260232 A1* | 10/2008 | Ohara | A61B 6/484 382/132 |
| 2009/0245661 A1* | 10/2009 | Ilbery | H04N 19/33 382/233 |
| 2010/0014771 A1* | 1/2010 | Kim | G06T 5/20 382/263 |
| 2010/0104202 A1* | 4/2010 | Chen | H04N 5/21 382/218 |
| 2011/0164823 A1 | 7/2011 | Park et al. | |
| 2012/0014608 A1 | 1/2012 | Watanabe | |
| 2014/0241645 A1* | 8/2014 | Esaki | G06T 5/001 382/263 |
| 2016/0314363 A1* | 10/2016 | Choi | G06K 9/00805 |

* cited by examiner

Primary Examiner — Mekonen T Bekele
(74) Attorney, Agent, or Firm — Wood Herron & Evans LLP

(57) ABSTRACT

A method for generating a mask based on a camera stream includes obtaining an image of the camera stream, generating a difference image, by subtracting two consecutive images from each other, one being the obtained image, providing a previous accumulated difference image and generating an accumulated difference image, generating an edge image by detecting edges in the obtained image, providing a previous accumulated edge image and generating an accumulated edge image, generating a combined image by combining the accumulated edge image and the accumulated difference image, defining a first threshold pixel value for the combined image, and generating the mask by including in the mask all pixels of the combined image, which have a same relation to the first threshold pixel value as that of a center pixel of the combined image.

16 Claims, 3 Drawing Sheets

METHOD, COMPUTER PROGRAM PRODUCT AND COMPUTER READABLE MEDIUM FOR GENERATING A MASK FOR A CAMERA STREAM

TECHNICAL FIELD

The invention relates to a method for generating a mask for non-static areas of a camera stream. The invention relates also to a computer program product and computer readable medium implementing the method.

BACKGROUND ART

Processing several images of a camera stream usually includes subtracting consecutive images or frames in order to distinguish between stationary and dynamic or changing parts of the images. Most applications e.g. those related to autonomous vehicles usually require to disregard the stationary parts of the images resulting in faster and more effective processing of the dynamically changing parts.

A method for using image subtraction and dynamic thresholding is disclosed in U.S. Pat. No. 6,061,476. Images are taken before and after the application of a solder paste on printed circuit boards, then the before and after images are subtracted in order to inspect the applied paste. Both the negative and positive subtracted images are processed further by separating the foreground and the background of the subtracted images by dynamic thresholds instead of scalar thresholds. Dynamic thresholds are claimed to enable a more precise detection of the foreground than scalar thresholds. The dynamic thresholding results in a subtracted positive and a subtracted negative image, and then these images are merged and binarized. Edge detection by a Sobel edge detector is performed on the before and after images followed by a true peak detection in order to eliminate false edges. Then the resulting images are binarized by a binarization map. The pixels corresponding to the paste are determined by subtracting the binarized before and after images.

A disadvantage of the above described method is that due to the complex edge detection algorithms, it is not suitable for real-time signal processing.

A method for extracting foreground object image from a video stream is disclosed in US 2011/0164823 A1. The method includes separating the background from the foreground of an image by calculating edges of the frames and a reference background image. The foreground is extracted by subtracting the edges of the frames and the reference background image. The method can also include thresholding to remove noises from the images. The disadvantage of the method is that it requires a reference background image that can be difficult to provide in certain applications. For example, dashboard cameras of autonomous or self-driving cars may not be able to take reference background images required for the method.

In US 2012/0014608 A1 an apparatus and a method for image processing is disclosed. Based on a feature analysis of an image a region-of-interest (ROI) is determined and a mask is created for the ROI. According to this invention, the ROI can be more precisely specified by detecting edges of the images, because the features to be detected by the method have a continuous edge that can be extracted by edge detection algorithms. The ROI masks generated by different methods are synthetized generating a mask for "the region of the most interest". However, the area covered by the created masks is not limited only to the interesting features, but also includes some of its surroundings as the generated masks have a rectangular shape. Thus, the above described method only ensures that the interesting features of the images are part of the mask, but the mask may include further image parts. This will result higher data storage needs, which is disadvantageous for the real-time evaluation of the images.

In view of the known approaches, there is a need for a method by the help of which a mask covering non-static areas of a camera stream can be generated in a more efficient way than the prior art approaches to enable real-time mask generation for the camera stream.

DESCRIPTION OF THE INVENTION

The primary object of the invention is to provide a method for generating a mask for a non-static camera stream, which is free of the disadvantages of prior art approaches to the greatest possible extent.

The object of the invention is to provide a method by the help of which a mask can be created in a more efficient way than the prior art approaches in order to enable the identification of non-static regions of camera images. Accordingly, the object of the invention is to provide a fast mask generating method that is able to generate a mask in real time enabling to filter out regions of uninterest, mainly static areas from a camera stream.

Furthermore, the object of the invention is to provide a non-transitory computer program product for implementing the steps of the method according to the invention on one or more computers and a non-transitory computer readable medium comprising instructions for carrying out the steps of the method on one or more computers.

The objects of the invention can be achieved by the method according to claim 1. Preferred embodiments of the invention are defined in the dependent claims. The objects of the invention can be further achieved by the non-transitory computer program product according to claim 15, and by the non-transitory computer readable medium according to claim 16.

The main advantage of the method according to the invention compared to prior art approaches comes from the fact that it generates a mask covering only the region of interest, i.e. the non-static part of the camera images. The size and the shape of the mask corresponds to the actual area and shape of the region of interest, thus processing any other pixels can be avoided. This can save time and resources for further processing of the images.

Another advantage of the method according to the invention is that the method is robust for lighting changes, as the edges and the changing, dynamic part of the image can always be detected. Thus, the method can be used in any lighting and weather conditions, and it is not affected by lighting changes either. Even if shadows are falling on the basically static areas of the images, it will not affect the mask generation as the mask generation starts from the middle of the image, thus the mask generation will already be finished before reaching these areas, because the boundary of the static and non-static areas are always closer to the center of the image than these areas.

It has been recognized, that having an additional step of edge detection provides more characteristic edges between static and non-static image parts, thus enabling faster and safer separation of non-static image parts for mask generation. The provided characteristic edges also enable safe and exact generation of the mask by simple algorithms like raymarching. Thus, contrary to the larger computational needs due to the additional edge detection step, the overall computational needs of the method can be reduced by simpler mask generating, and at the same time the generated mask will be more precise.

The method according to the invention is capable of generating masks in real time, thus the method can be applied for images recorded by cameras of autonomous or self-driving cars where real-time image processing and also discarding the static areas from images to save computational resources are especially important.

In the method according to the invention no further information or input is required besides the images originating from a camera stream.

BRIEF DESCRIPTION OF THE DRAWINGS

Preferred embodiments of the invention are described below by way of example with reference to the following drawings, where.

MODES FOR CARRYING OUT THE INVENTION

The invention relates to a method for generating a mask for non-static areas of a camera stream. The camera stream is provided by a camera and it has consecutive images 10, preferably a continuous series of images 10. The images 10 are preferably recorded at a given frequency. The camera may be mounted on a dashboard of a car or other vehicle or on a dashboard of a self-driving or autonomous car or other vehicle. Dashboard cameras usually have a field of view covering parts of the vehicle itself, e.g. parts of the dashboard or the window frame that are static, non-changing parts of the recorded images 10. These parts are out of the regions or areas of interest of the images 10, thus it is beneficial to exclude them from further processing by generating a mask for the regions or areas of interest including the non-static, changing parts of the camera stream.

The camera may be configured to record color (e.g. RGB) images or grayscale images, thus the images 10 of the camera stream may be either color or grayscale images.

Figure 1:
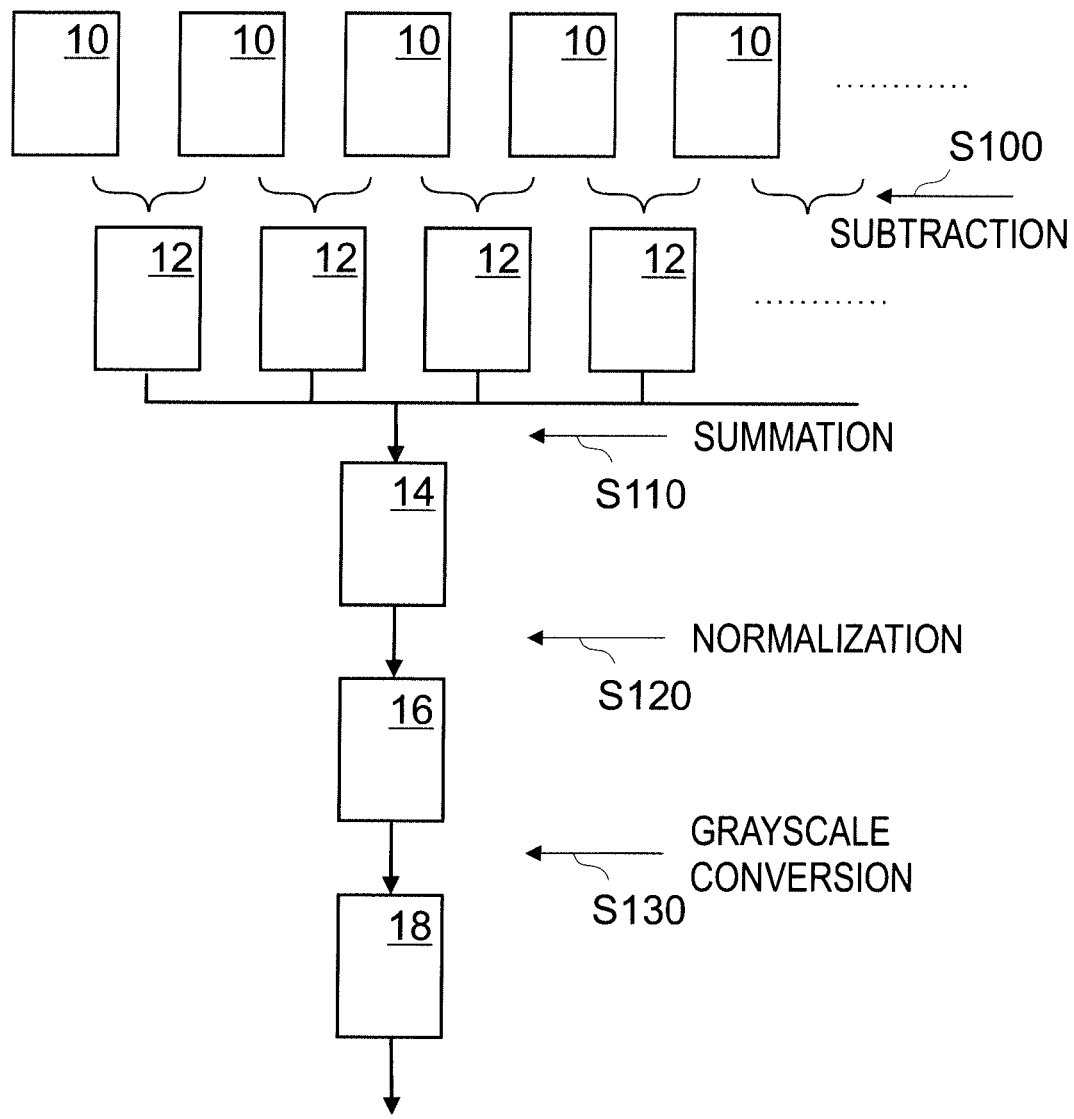
FIG. 1 is a flow diagram of steps of an embodiment of the method according to the invention generating an accumulated difference image.

The method according to the invention includes a step of obtaining an image 10 of the camera stream. After obtaining the image 10 of the camera stream, the steps of an embodiment of the method are illustrated in FIG. 1 including the generation of an accumulated difference image 14 from a camera stream. The camera stream has consecutive images 10, wherein the consecutive images 10 can be images 10 recorded directly one after the other or images 10 recorded some time after each other (having further images 10 therebetween).

In step S100 a difference image 12 is generated by subtracting two consecutive images 10 from each other, wherein one of the consecutive images 10 is the obtained (being preferably the current) image 10. Preferably, the image 10 recorded later is subtracted from the image 10 recorded earlier. The difference image 12 has lower values for static, non-changing image parts than for non-static, dynamically changing image parts. Difference images 12, preferably consecutive difference images 12 are summed in step S110 in order to generate an accumulated difference image 14 enhancing the difference between the static and non-static parts of the image. In a preferred embodiment of the method, a previous accumulated difference image 14 is provided, e.g. from previous steps implementing the method, wherein the previous accumulated difference image(s) 14 is/are preferably stored by a computer, and the accumulated difference image 14 is generated by adding the difference image 12 to the previous accumulated difference image 14.

In one preferred embodiment of the method, the accumulated difference image 14 is normalized in a first normalization step S120 by dividing each pixel value by the number of accumulated images. This optional step thus results in a normalized accumulated difference image 16 that has pixel values of a normal color (RGB) or grayscale image. The first normalization in step S120 will thus prevent the accumulation of pixel values over a limit and avoid computational problems such as overflow. In case of the camera records color images, the first normalization step S120 is to be taken for each color channel separately, in case of RBG images for the red, blue and green channels.

If the camera stream consists of color images, then the method preferably comprises a first conversion step S130 for conversing the color images to grayscale images. The first conversion step S130 may be implemented before the subtraction step S100, between the subtraction step S100 and the summation step S110, between the summation step S110 and the first normalization step S120 or after the first normalization step S120. In the one hand, if the first conversion step S130 is implemented before the summation step S110 then the conversion has to be executed for all images 10 or for all difference images 12, resulting in higher computational needs. In the other hand, if the first conversion step S130 is implemented after the summation step S110 then the conversion is affected on only one image, namely either on the accumulated difference image 14 or on the normalized accumulated difference image 16. However, each step before the first conversion step S130 have to be implemented on every color channel of the images. The first conversion step S130 may be implemented by any conversion method or algorithm known in the state of the art.

In one preferred embodiment of the method illustrated in FIG. 1 the first conversion step S130 is implemented on the normalized accumulated difference image 16 resulting in a grayscale normalized accumulated difference image 18.

Figure 3:
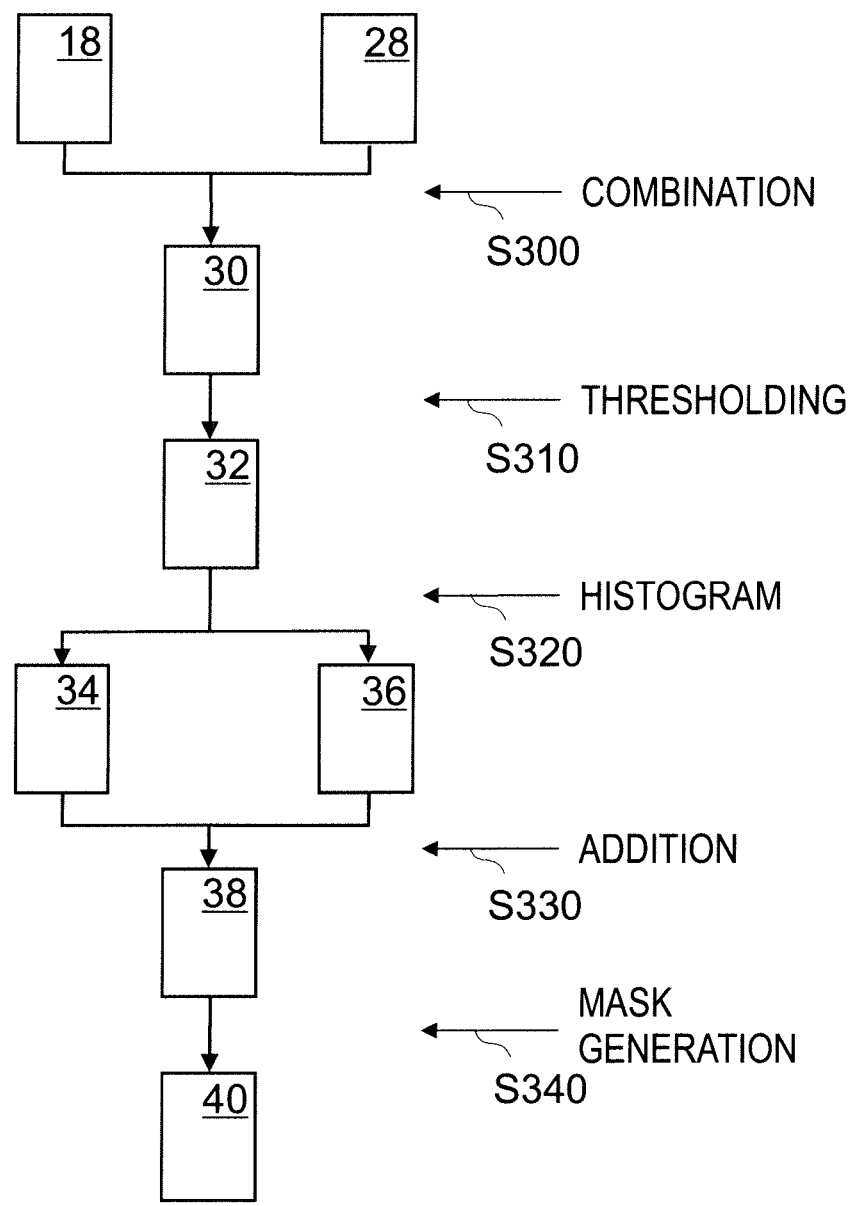
FIG. 3 is a flow diagram of yet further steps of an embodiment of the method according to the invention generating the mask from the accumulated difference image and the accumulated edge image.

According to the invention, the accumulated difference image 14, or in case of the implementation of the first normalization step S120 the normalized accumulated difference image 16, or in case of the implementation of the first conversion step S130 the grayscale accumulated difference image 18 is processed by further steps of the method according to the invention illustrated in FIG. 3.

Besides the steps illustrated in FIG. 1 the obtained images 10 of the camera stream are subject to edge detection for detecting the edges of the static areas of the camera stream. The possible steps of edge detection of the camera images are illustrated in FIG. 2.

According to a preferred embodiment of the method, the obtained images 10 are blurred in step S200 in order to smooth the raw images before edge detection. The exact method for blurring is to be chosen to fit the implemented edge detection algorithm. The blurring step S200 can be implemented by any blurring method or algorithm known in the state of the art such as box blurring or calculating histograms of the images 10. In a preferred embodiment of the method, the blurring step S200 is implemented by a Gaussian blurring having a kernel, more preferably by using a 3×3 Gaussian kernel or 3×3 discrete Gaussian kernel. The standard deviation of the Gaussian blurring is to be calculated respect to the size of the kernel. Blurring is used for noise reduction, because those edges that vanish by blurring would only create artefacts in the edge detection, thus eliminating them improves the performance of the edge detection and also of the mask generating method. The edges sought for in the method are the edges or boundaries of the static and dynamic areas of the images 10, thus blurring on the one hand would not eliminate them and on the other hand would result in a more continuous line along the sought edges. The blurring step S200 results in blurred images 20 having the same sizes and dimensions as the original images 10.

In a case where the camera records color images 10, the color images preferably converted to grayscale images in a second conversion step S210. The second conversion step S210 can be implemented before or after the blurring step S200. According to the preferred embodiment of the method, the second conversion step S210 results in a grayscale blurred image 22. The second conversion step S210 may be implemented by any conversion method or algorithm known in the state of the art.

Figure 2:
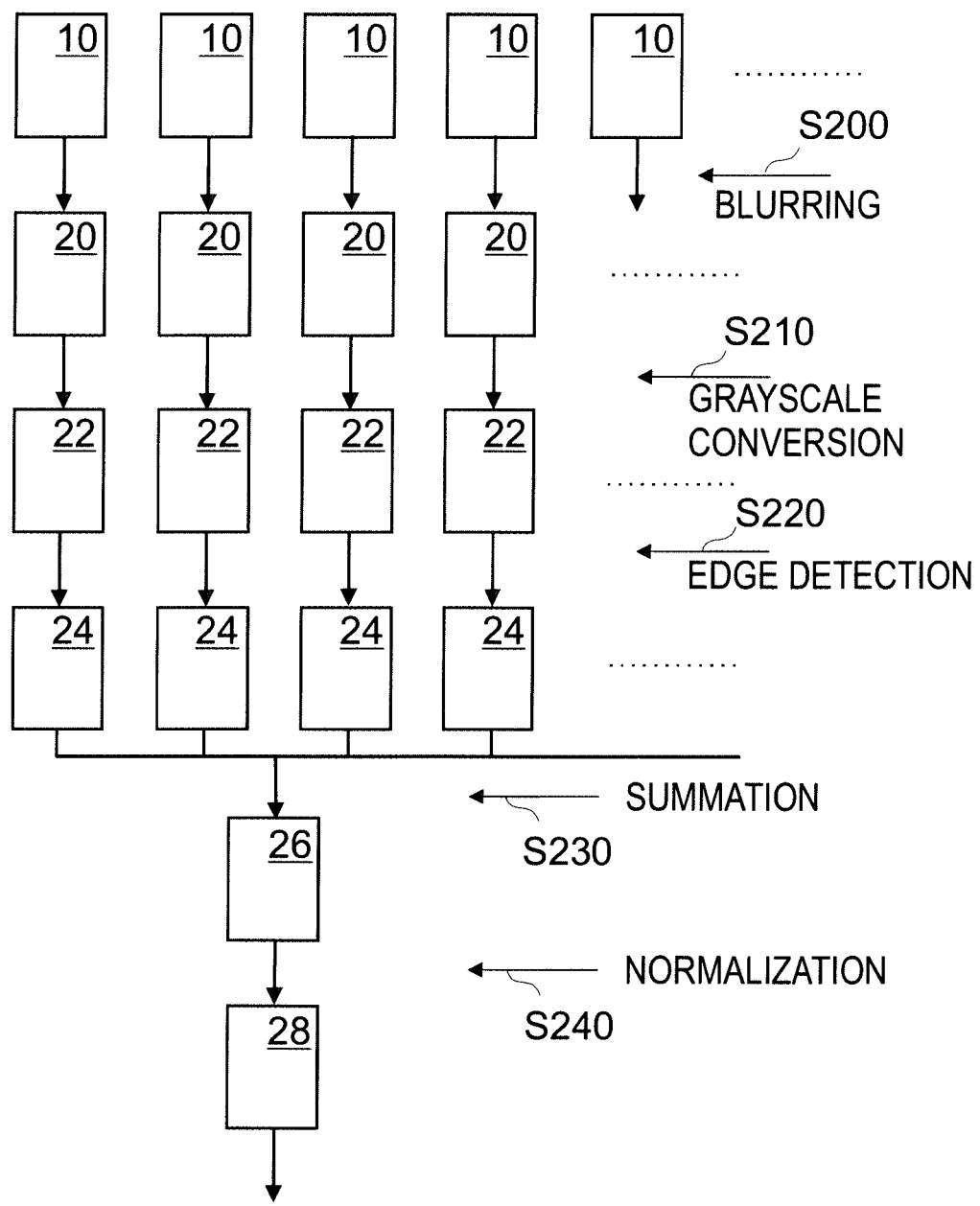
FIG. 2 is a flow diagram of further steps of an embodiment of the method according to the invention generating an accumulated edge image.

In a preferred embodiment of the method, the second conversion step S210 can be omitted, if the first conversion step S130 illustrated in FIG. 1 is implemented directly on the images 10 generating grayscale images, then the blurring step S200 of FIG. 2 can be implemented on the grayscale images. This embodiment also results in a grayscale blurred image 22.

In step S220 an edge image 24 is generated by detecting edges on the obtained image 10. If the image 10 was blurred in the blurring step S200, then the edge detection can be implemented on the blurred image 20. If either the image 10 or the blurred image 20 were converted to grayscale images, then the edge detection can also be implemented on the grayscale blurred image 22. The edge detection can be implemented by any edge detection algorithms known in the state of the art, for example first-order edge detectors such as Canny edge detector and its variations, Canny-Deriche detector, edge detectors using Sobel operator, Prewitt operator, Roberts cross operator or Frei-Chen operator; second-order edge detectors that are using second-order derivatives of the image intensities such as differential edge detectors (detecting the zero-crossings of the second-order directional derivative in the gradient direction), algorithms or edge detectors.

According to the present invention the edge detection is preferably implemented by a Laplacian algorithm having a kernel. The advantage of the Laplacian algorithm is that it finds the edges faster than the other, more complex algorithms and besides require smaller computational power. The Laplacian algorithm contains both negative and positive values around the detected edges, which values cancel each other for edges of moving objects, thus the static edges become significant faster. Laplacian kernels having different sizes can be used, the larger kernels resulting in slower edge detection, however the detected edges do not change drastically, thus smaller kernels provide similarly good results as larger kernels. The edge detection algorithm was found to be optimal utilizing a 3×3 Laplacian kernel. The edge detection step S220 results in consecutive edge image 24 having the same sizes of the images 10.

An accumulated edge image 26 is generated in step S230 by summing the edge images 24, preferably consecutive edge images 24. The accumulated edge image 26 has high values for static edges. Other edges and other parts of the images, for example edges of moving objects or dynamically changing areas have lower values than the static edges. The size of the accumulated edge image 26 is the same as the size of the images 10. In a preferred embodiment of the method, a previous accumulated edge image 26 is provided, e.g. from previous steps implementing the method, wherein the previous accumulated edge images 26 are preferably stored by a computer, and the accumulated edge image 26 is generated by adding the edge image 24 to the previous accumulated edge image 26.

In order to avoid excessive increase of the pixel values, the edge images 24 can be normalized in a second normalization step S240 by dividing each pixel value of the image by the number of accumulated images. The result of this second normalization step S240 is a normalized image, preferably a normalized accumulated edge image 28 having values in the same range as in any images 10 from the camera stream.

The accumulated edge image 26 or the normalized accumulated edge image 28 will be further processed in steps illustrated in FIG. 3 to generate a mask 40 for the non-static areas of the camera stream.

A preferred embodiment of subsequent steps for generating the mask 40 for the non-static areas of a camera stream are illustrated in FIG. 3. The method uses the result of the steps of calculating of the difference image illustrated in FIG. 1, for example the accumulated difference image 14, the normalized accumulated difference image 16, or the grayscale accumulated difference image 18, and the result of edge detection illustrated in FIG. 2, for example the accumulated edge image 26 or the normalized accumulated edge image 28.

The accumulated difference image 14 and the accumulated edge image 26 can be interpreted as histograms having the same sizes as the input images 10 of the camera stream. This interpretation is also applicable to the normalized accumulated difference image 16, to the grayscale accumulated difference image 18 and to the normalized accumulated edge image 28. The histogram of the accumulated differences (the accumulated difference image 14, the normalized accumulated difference image 16, or the grayscale accumulated difference image 18) tends to show low values for static areas, because these areas remain unchanged in the images, thus the difference will be close to zero. The histogram of the accumulated edges (accumulated edge image 26, or normalized accumulated edge image 28) has high values for static edges and low values for the changing, dynamic areas. For the mask to be generated, areas subject to constant change are to be determined. For this reason, in a combination step S300 the histogram of the accumulated edges is combined with the histogram of the accumulated differences to emphasize a contour of static areas. The combination step S300 results in a combined image 30 generated by the combination of the histograms, wherein the combination of the histograms might be implemented by a simple subtraction. The emphasizing effect can be even more pronounced in case if the histograms are normalized, namely if the normalized accumulated edge image 28 is combined with the normalized accumulated difference image 16, or preferably if the normalized accumulated edge image 28 is subtracted from the normalized accumulated difference image 16. This latter preferred embodiment is illustrated in FIG. 3, wherein in the combination step S300 the normalized accumulated edge image 28 is subtracted from the normalized accumulated difference image 16 resulting in a combined image 30 having extraneous low values for the contour of static areas.

In embodiments of the method in which the edge image 24 is calculated by a Laplacian edge detection algorithm, the absolute values of the accumulated edge images 26 is to be calculated, because the Laplacian edge detection includes both negative and positive values, thus the negative values are to be eliminated by replacing them with their additive inverse value.

The result of the combination step S300 is the combined image 30 having extraneous values, e.g. extraneous low values in case of subtraction for the contour of static areas. A first threshold pixel value is defined for the combined image 30 in order to discriminate the extraneous values of the combined image 30.

The mask 40 is generated in mask generation step S340 by including pixels of the combined image 30, which pixels have the same relation to the first threshold pixel value as that of a center pixel of the combined image 30. Regarding the relation of the pixel value of the center pixel to the first threshold pixel value, the pixel value of the center pixel can be greater than, greater than or equal to, less than, or less than or equal to the first threshold pixel value. Preferably, the mask 40 will include only those pixels of the combined image 30 that have the same relation to the first threshold pixel value as that of the center pixel and form a continuous region within the combined image 30, thus further pixels having the same relation to the first threshold pixel value as that of the center pixel (e.g. close to the peripheries of the combined image 30) will not be included in the mask 40. The center pixel can be any pixel close to or being in the geometrical center of the combined image 30.

In a preferred embodiment of the method according to the invention, the generation of the mask 40 is started from any center pixel of the combined image 30 and is proceeded towards the peripheries of the combined image 30. The inclusion of the pixels of the mask 40 is stopped at pixels not having the same relation to the first threshold pixel value as that of the center pixel of the combined image 30. This automatically excludes further (random) pixels having the same relation to the first threshold pixel value as that of the center pixel from the mask 40.

The method according to the invention can include further steps as indicated in FIG. 3. The preferred embodiment of the method shown in FIG. 3 includes a first thresholding step S310, wherein the first threshold pixel value is preferably chosen to be close to zero if the combination step S300 was implemented by subtraction, as the features and areas to be marked have extremely low values compared to other parts of the images. If the combined image 30 was calculated from normalized images, e.g. the normalized accumulated edge image 28 is combined with (or subtracted from) either the normalized accumulated difference image 16 or the grayscale normalized accumulated difference image 18, then the absolute values of the combined image 30 are preferably in the range of [0,1] due to the normalization, while the values corresponding to the static edges can be a magnitude smaller than one. As the number of accumulated images increases, the normalized pixel value of the static edges decreases and gets closer and closer to zero. In a preferred embodiment of the method according to the invention the first threshold pixel value for marking the contour of non-static edges having extremely low values is chosen to be at least one magnitude smaller than one, e.g. the first threshold pixel value may be less than 0.1. For optimal results, the first threshold pixel value is set at least two magnitudes smaller or more preferably three magnitudes smaller than one, for example the first threshold pixel value is set less than 0.01 or more preferably less than 0.001 or even less than 0.0001.

In the first thresholding step S310 a thresholded binary image 32 is generated by thresholding and binarizing the combined image 30. Pixels having lower values than the first threshold pixel value are set to a first pixel value and pixels having higher values than the first threshold pixel value are set to a second pixel values, wherein the first pixel value and the second pixel value are different from each other. Preferably, the first pixel value is the maximum pixel value or 1, and the second pixel value is the minimum pixel value or zero. This way the first thresholding step S310 simultaneously accomplishes the thresholding and the binarization of the combined image 30. The static areas of the original images 10 have the same pixel value (the second pixel value), while the non-static parts of the original images 10 have a different pixel value (the first pixel value).

The thresholded binary image 32 is preferably blurred by calculating histograms, preferably by calculating two or more histograms with different orientations of the thresholded binary image 32, more preferably by calculating a horizontal histogram 34 and a vertical histogram 36 for horizontal and vertical blurring respectively in histogram calculation step S320. The histograms, for example the horizontal histogram 34 and the vertical histogram 36 have smaller sizes than the images 10 of the camera stream. The bins of the horizontal histogram 34 and of the vertical histogram 36 are preferably set proportional to the width and the height of the images, respectively, and the sizes of the bins determine the characteristic size of the image features to be blurred or filtered out. Smaller bins only blur out smaller features, while larger bins can filter out larger structures of the images. Preferably the bin of the horizontal histogram 34 has a vertical size of 1 pixel in the vertical direction and a horizontal size being a fraction of the horizontal size (width) of the thresholded binary image 32, more preferably the horizontal size of the bin is in the range of $\frac{1}{10}$-$\frac{1}{100}$ of the width of the thresholded binary image 32. The bin of the vertical histogram 36 is preferably having a horizontal size of 1 pixel and a vertical size being a fraction of the vertical size (height) of the thresholded binary image 32, more preferably the vertical size of the bin is in the range of $\frac{1}{10}$-$\frac{1}{100}$ of the height of the thresholded binary image 32. Preferably the horizontal size of the bin of the horizontal histogram 34 and the vertical size of the bin of the vertical histogram 36 are determined by dividing the respective size of the thresholded binary image 32 by the same number, for example if the horizontal size of the bin of the horizontal histogram 34 is one tenth of the horizontal size of the thresholded binary image 32, then the vertical size of the bin of the vertical histogram 36 is also one tenth of the vertical size of the thresholded binary image 32. For each bins of the horizontal histogram 34 and vertical histogram 36 a Gaussian kernel having the same size as the bins are applied, and the standard deviation of the Gaussian kernel is determined by the size of the kernel.

The calculation of the horizontal histogram 34 and the vertical histogram 36 implements blurring of the thresholded binary image 32 in order to remove weak features or noises of the thresholded binary image 32. The horizontal and vertical blurring is preferably implemented separately by calculating the horizontal histogram 34 and the vertical histogram 36.

In one embodiment of the method the blurring (calculation of histograms) in step S320 is carried out in rotated directions, preferably in directions having an angle 45° and −45° respect to the sides of the thresholded binary image 32.

In an other embodiment of the method the blurring (calculation of histograms) in step S320 is carried out in horizontal and vertical directions and also in rotated directions, preferably in directions having an angle 45° and −45° respect to the sides of the thresholded binary image 32.

The method preferably includes a supplementary step in which the histograms are stretched to the size of the original images 10. The horizontal histogram 34 and the vertical histogram 36 are combined together in step S330, preferably by simple addition, resulting in a combined histogram image 38 having the same size as the original images 10.

The method according to the invention preferably comprises a second thresholding step (not illustrated in FIG. 3) for further noise reduction. Depending on a selected second threshold pixel value, the thickness of the edges can be affected. The second threshold pixel value is preferably determined based on the maximum pixel value of the combined histogram image 38, for example the second threshold pixel value is set to half of or around the maximum pixel value of the combined histogram image 38. Selecting a higher second threshold pixel value results in eliminating more features of the image and also eliminating parts of the edges, usually leading to thin edges. Selecting a lower second threshold pixel value results in an image having more remaining features and thicker edges. Preferably, a compromise is to be made between eliminating disturbing features from the image and having a reasonably thick edge. The second threshold pixel value having a value of half of the maximum pixel value is found to be eliminating the disturbing and noise-like features of the combined histogram image 38 and the edges are also having an optimal thickness. In the second thresholding step, similarly to the first thresholding step S310, the combined histogram image 38 is binarized in the following way. The pixels having values above the second threshold pixel value are set to a certain value, preferably to the maximal pixel value, more preferably to the value of 1. The pixels having a value of less than the second threshold pixel value are set to the minimal pixel value or zero. The resulting image has maximal values for the static edges and minimal values for the other parts of the image, and the size of this image is the same as of the original images 10.

According to the embodiment of FIG. 3, the mask 40 is generated the following way. Starting from a center of the image and proceeding towards peripheries of the image the mask 40 includes all pixels having the same pixel value as in the center. The inclusion of the pixels is stopped at pixels having a different pixel value, namely the other pixel value of the image.

The starting point of the mask generation step S340 can be any other pixel from around the center of the image, because the areas around the center of the image has the highest possibility for not having a static edge pixel.

In one embodiment of the method the generation of the mask 40 can be started from different starting points around the center of the image, thus the method will be more robust and possible remaining artefacts or features of the images will not hinder the generation of the mask 40.

In a further embodiment of the method, the mask generation step S340 is implemented by a raymarching algorithm following straight lines starting from the center of the image towards the periphery of the image. The raymarching algorithm takes longer and varying steps along each lines of direction, and as a result it finds the different pixel values faster than other algorithms. In this embodiment all pixels up to those not having the same relation to the first pixel value as that of the center pixel of the combined image 30 are included in the mask 40.

For further obtained images, preferably for each newly acquired image 10 of the camera stream the mask 40 can be re-generated by repeating one or more above described steps of the method. The consecutively generated masks 40 can be different from each other due to uncertainties in the recorded images 10, shaking of the camera, or other reasons. However, as the number of accumulated images 10 is increasing, the mask 40 will cover more and more the real regions of interest, namely the dynamically changing parts of the images, thus after a certain period of time the generation of the mask 40 can be stopped, as the newly generated masks 40 will not differ from each other and is expected to cover basically the same areas and same pixels.

In a preferred embodiment of the method the generation of the masks 40 can be stopped when reaching a stable mask 40, to save time and computational resources. Stopping of the mask generation can be implemented manually or automatically by applying a stopping condition. In case of automatic stopping, the generation of the masks 40 automatically stops, if the stopping condition is fulfilled. Once the generation of masks 40 stops, the last generated mask 40 can be used for further images 10 of the camera stream. The applied stopping condition can assure that the generated mask 40 is stable enough.

In an embodiment of the method the generation of masks 40 can be automatically stopped after a predetermined period of time or after obtaining a predetermined number of images 10.

In another embodiment of the method, the stopping condition is implemented by evaluating a function with respect to a predetermined limit value. This embodiment of the method includes the steps of calculating a metric value for each generated mask 40, calculating the function of the metric value and stopping the generation of the masks 40 based on a comparison of a result of the function with the predetermined limit value.

In a preferred embodiment of the method, the metric value of the masks 40 is a pixel count of the mask 40 (the total amount of pixels included in the mask 40), and the function includes a difference of the pixel counts of consecutive masks 40 and averaging a predetermined number of subtracted pixel counts. The stopping condition is fulfilled and the generation of the masks 40 is stopped if the result of the function is below a predetermined limit value. Thus, the stopping condition is reached if the mask 40 has become stable enough that the number of pixels belonging to the mask 40 is not changing significantly.

Besides averaging, further functions can also be used for the stopping condition, for example the functions can include suitable filtering methods such as a Kalman filter, a GH-filter (also known as alpha-beta filter), etc. The advantage of the method including averaging in the stopping condition is that it is sufficiently reliable and requires smaller computational resources than more complex filtering methods, thus suitable for real time mask generation.

In case of a misalignment of the camera, the method according to this invention has to be started over to be sure that the mask 40 covers the real region of interest.

For safety reasons, the mask generating method can be started over after each time, when the camera stream was stopped and then re-started. This way the possible camera misalignments or other effects can be corrected by the generation of a new mask 40.

Some dashboard cameras are so called fisheye cameras having an ultra-wide-angle lens named fisheye lens. Such fisheye lenses achieve extremely wide angles of view making them desirable for applications in autonomous or self-driving cars or other vehicles. Due to the large angles of view, the camera images are bound to record blank areas, such as static parts of the cars or other vehicles, and these blank areas are located around the outer sides of the images. The following supplementary method may be applied to exclude of the blank areas from a mask of fisheye cameras.

The fisheye cameras can record color or grayscale fisheye images 10.

The consecutive fisheye images 10 are accumulated directly from the first recorded fisheye camera image, more preferably the color values of the images 10 are accumulated, resulting in consecutive accumulated fisheye images. The accumulated fisheye images are normalized by the number of the accumulated images.

A third threshold pixel value may be calculated by calculating the mean of the pixel values on the perimeters of the image if the blank area of the fisheye image is not continuous on the perimeters of the fisheye image. This calculation of the third threshold pixel value has been found to be advantageous for thresholding the accumulated fisheye image as this third threshold pixel value keeps balance between removing and keeping pixels. This thresholded fisheye image includes features of the image while the blank areas of the fisheye images are excluded. This third thresholding is implemented similar to the first thresholding step S310, also including binarization of the image.

The thresholded fisheye image can be subject to a fisheye mask generating step, but contrary to the previously described mask generation step S340, this mask is generated starting from the perimeter pixels of the image and traversing inwards. In the fisheye mask generating step the pixels have the same value as the perimeter pixels are stored until reaching the first pixels having different values. A convex hull is built around the stored pixels enveloping the blank areas of the fisheye images. The generated mask includes the pixels outside of the convex hull.

The generation of the continuous series of masks for fisheye images can be stopped if the generated masks are becoming stable, for example by implementing any of the previously described stopping conditions.

The invention, furthermore, relates to a computer program product comprising instructions which, when the program is executed by a computer, cause the computer to carry out an embodiment of the method according to the invention.

The computer program product may be executable by one or more computers.

The invention also relates to a computer readable medium comprising instructions which, when executed by a computer, cause the computer to carry out an embodiment of the method according to the invention.

The computer readable medium may be a single one or comprise more separate pieces.

The invention is, of course, not limited to the preferred embodiments described in detail above, but further variants, modifications and developments are possible within the scope of protection determined by the claims. Furthermore, all embodiments that can be defined by any arbitrary dependent claim combination belong to the invention.

The invention claimed is:

1. A method for generating a mask for non-static areas based on a camera stream having consecutive images, comprising the steps of obtaining an image of the camera stream, generating a difference image, the difference image being generated by subtracting two consecutive images from each other, one being the obtained image, providing a previous accumulated difference image consisting of a sum of previously generated consecutive difference images and generating an accumulated difference image by adding the difference image to the previous accumulated difference image, generating an edge image by detecting edges in the obtained image, providing a previous accumulated edge image consisting of a sum of consecutive previously generated edge images and generating an accumulated edge image by adding the edge image to the previous accumulated edge image, generating a combined image by combining the accumulated edge image and the accumulated difference image, defining a first threshold pixel value for the combined image, and generating the mask by including in the mask pixels of the combined image, which have a same relation to the first threshold pixel value as that of a center pixel of the combined image.

2. The method according to claim 1, characterized by starting the generation of the mask from the center pixel of the combined image and proceeding towards peripheries of the combined image, and stopping inclusion of pixels in the mask at pixels not having the same relation to the first threshold pixel value as that of the center pixel of the combined image.

3. The method according to claim 1, characterized by repeating the steps of claim 1 and stopping the mask generation if a stopping condition is fulfilled.

4. The method according to claim 3, characterized by checking the stopping condition by means of evaluating a function with respect to a predetermined limit value, comprising the steps of calculating a metric value for each generated mask, calculating the function of the metric value, and stopping the generation of the masks based on a comparison of a result of the function with the predetermined limit value.

5. The method according to claim 4, characterized in that the metric value is a pixel count for each generated mask, the function comprises a difference of the pixel counts of consecutive masks, and an averaging of a predetermined number of subtracted pixel counts, and stopping the generation of the masks if the result of the function is below the predetermined limit value.

6. The method according to claim 1, characterized by comprising a further step after defining the first threshold pixel value, the step including generating a thresholded binary image by thresholding and binarizing the combined image by setting pixels having lower values than the first threshold pixel value to a first pixel value and setting pixels having higher values than the first threshold pixel value to a second pixel value, wherein the first pixel value and the second pixel value are different from each other.

7. The method according to claim 6, characterized by comprising further steps after generating the thresholded binary image, the further steps including calculating two or more histograms with different orientations of the thresholded binary image, the histograms being calculated with a smoothing kernel, generating a combined histogram image by combining the histograms, the combined histogram image having a smaller size than an original image, and stretching the combined histogram image to the size of the images of the camera stream.

8. The method according to claim 7, characterized by implementing a second thresholding on the stretched combined histogram image for noise reduction by using a second threshold pixel value, and setting pixels having higher values than the second threshold pixel value to either the first pixel value or the second pixel value, and setting the pixels having lower values than the second threshold pixel value to the other pixel value.

9. The method according to claim 8, characterized in that the second threshold pixel value is set to half of a maximum pixel value of the combined histogram image.

10. The method according to claim 1, characterized by using a normalized accumulated difference image as the accumulated difference image and using a normalized accumulated edge image as the accumulated edge image, wherein the number of the accumulated images are counted, the normalized accumulated difference image is generated by dividing the accumulated difference image with the number of accumulated images, and the normalized accumulated edge image is generated by dividing the accumulated edge image with the number of accumulated images.

11. The method according to claim 1, characterized by generating the combined image by subtracting the accumulated edge image from the accumulated difference image.

12. The method according to claim 1, characterized in that the edge detection step is implemented by a Laplacian edge detection algorithm.

13. The method according to claim 12, characterized by including an additional step of blurring the images, preferably by a blurring Gaussian kernel, before the edge detection step.

14. The method according to claim 1, characterized in that the mask generation step is implemented by a raymarching algorithm starting from the center of the image.

15. A non-transitory computer program product comprising instructions which, when the program is executed by a computer, cause the computer to carry out the method of claim 1.

16. A non-transitory computer readable medium comprising instructions which, when executed by a computer, cause the computer to carry out the method of claim 1.

* * * * *